July 4, 1950 A. R. MADSEN 2,514,249
PLANTING AND THINNING VEHICLE
Filed Feb. 10, 1949 3 Sheets-Sheet 3
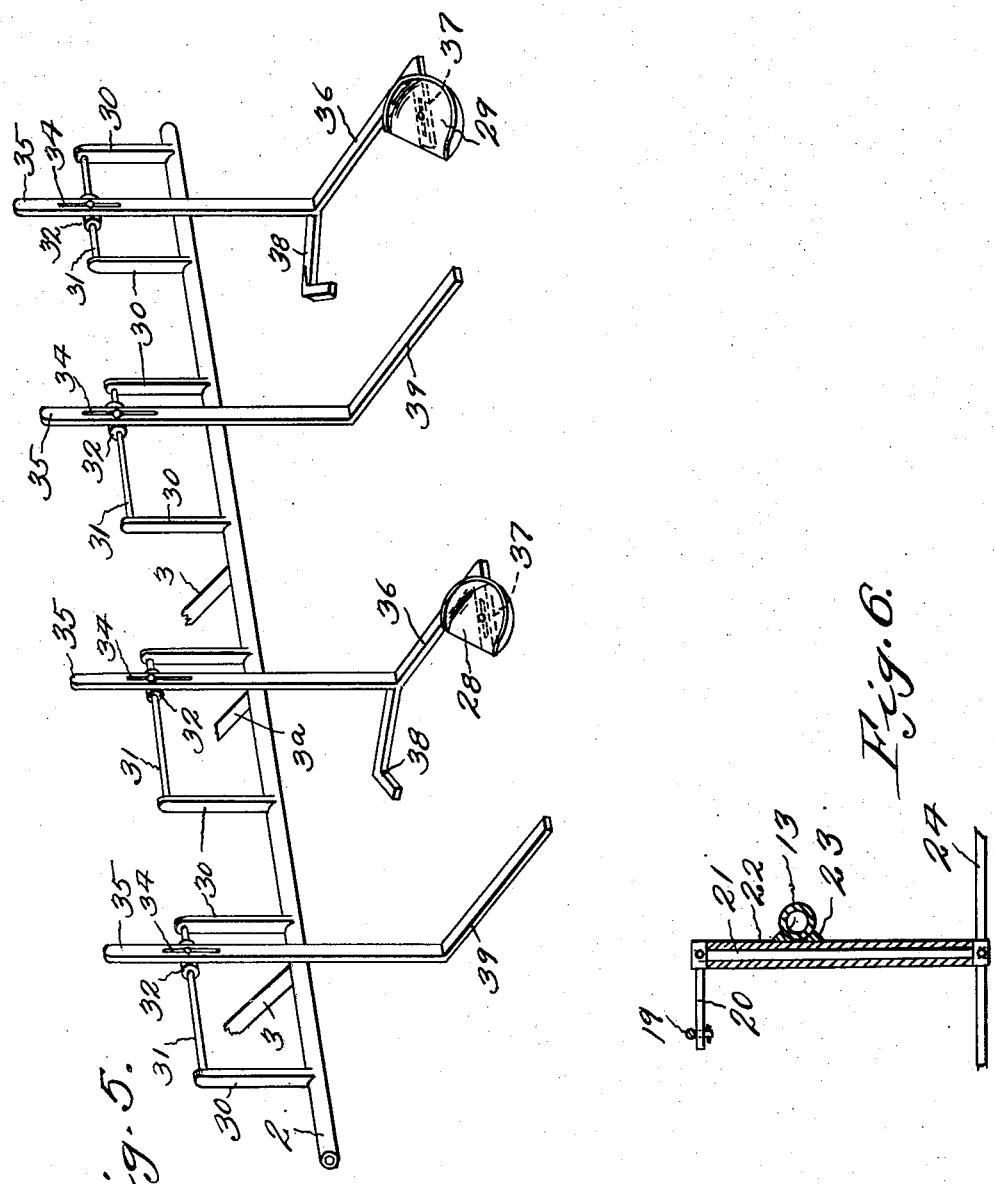
Inventor
Alvin R. Madsen
By Philip A. H. Sewell
Attorney Patented July 4, 1950

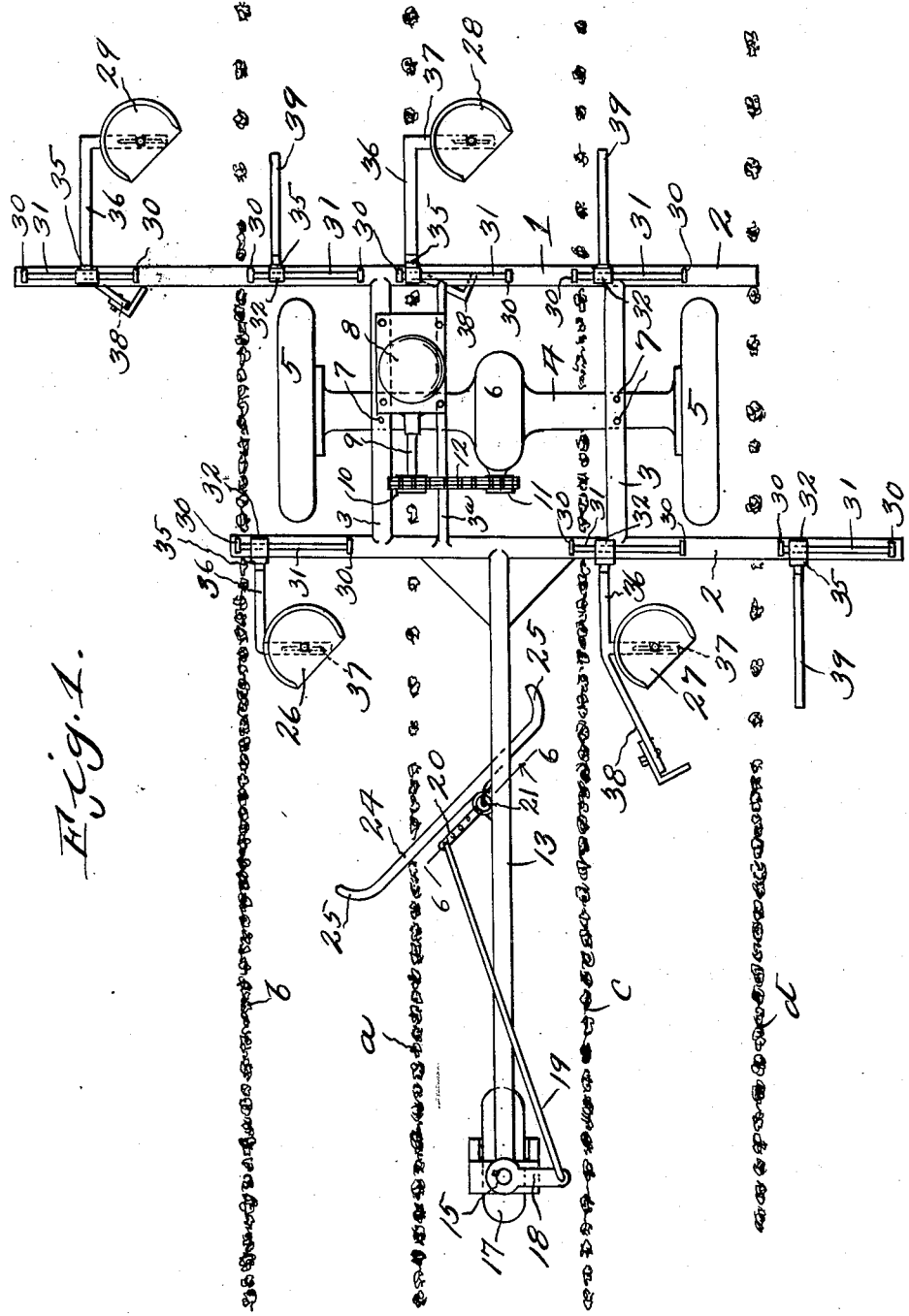

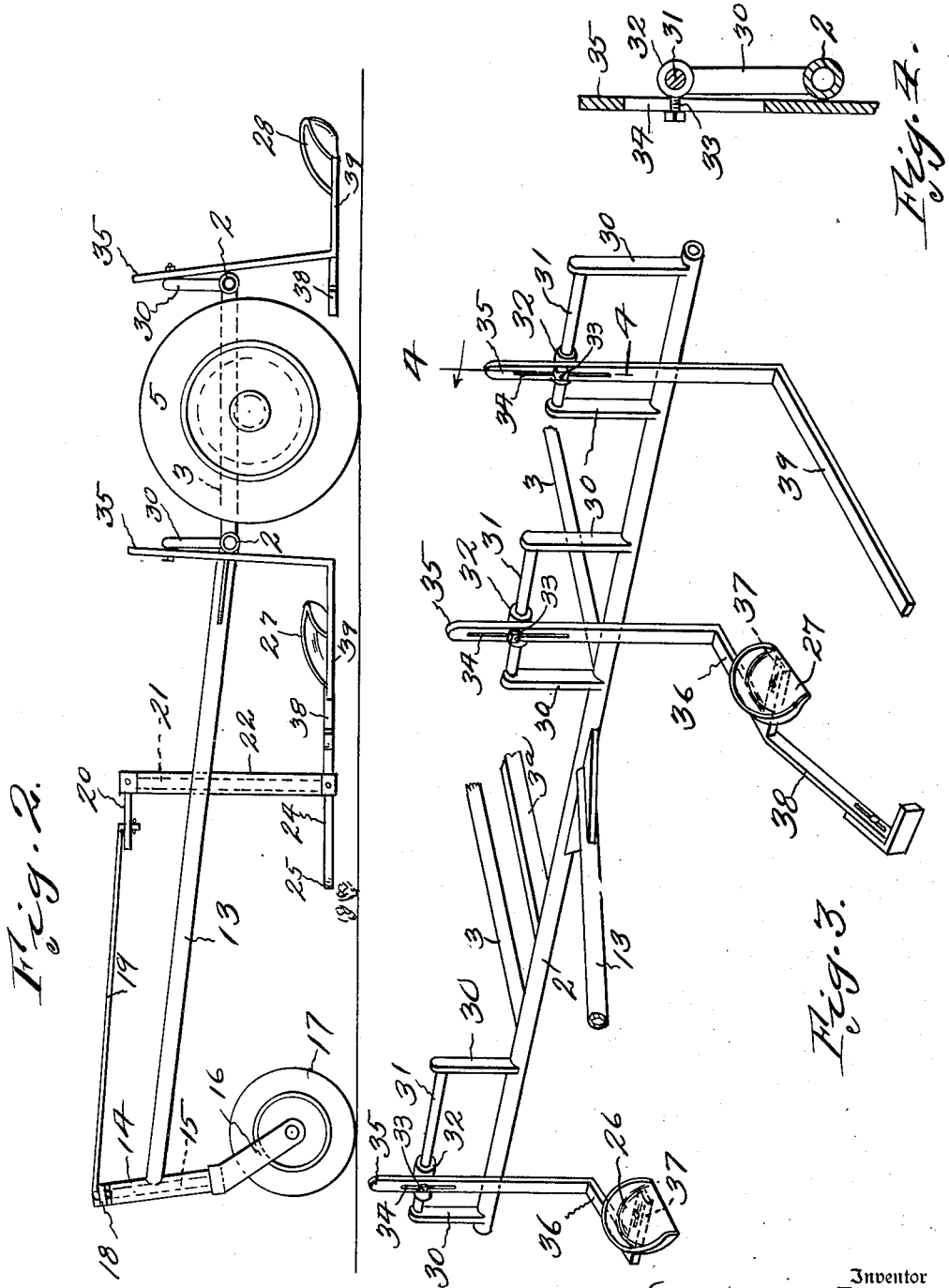

2,514,249

UNITED STATES PATENT OFFICE 2,514,249

PLANTING AND THINNING VEHICLE

Alvin R. Madsen, Rupert, Idaho

Application February 10, 1949, Serial No. 75,658

2 Claims. (Cl. 97—1)

The invention relates to straddle row vehicles, preferably power driven, and a plurality of seats depending from the vehicle frame in positions between the rows, and in positions whereby occupants of the seats may plant or thin the rows as the vehicle advances.

A further object is to support the seats from brackets carried by the frame, and in a manner whereby the seats may be transversely adjusted in relation to the rows to accommodate the seats to the reach of the operators on the machine. The thinning or planting operation being a manual one.

A further object is to provide adjustable foot rests carried by the frame in substantially the plane of the seats, and adjustable in relation to the seats.

A further object is to position the seats so the operators thereon will face at a forwardly inclined angle towards the rows of plants, so the thinning operation can be easily and comfortably accomplished as the vehicle advances.

A further object is to steer the vehicle through the medium of one of the foot rests, operated by one of the operators.

A further object is to support the vehicle on three wheels, the forward wheel being a single one carried by a forwardly extending bar.

A further object is to form the frame from spaced transverse bars connected together by longitudinal bars, to which longitudinal bars the rear axle housing is attached, and to provide each transverse bar with spaced upwardly disposed seat and foot rest supporting shafts.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 1 is a top plan view of the machine showing the machine straddling four rows of plants.

Figure 2 is a side elevation of the machine.

Figure 3 is a perspective view of the forward transverse bar of the frame showing the seat and foot rest supports.

Figure 4 is a vertical transverse sectional view taken on line 4—4 of Figure 3.

Figure 5 is a perspective view of the rear transverse bar of the frame, showing the seat and foot supporting brackets.

Figure 6 is a vertical sectional view taken on line 6—6 of Figure 1.

Referring to the drawings, the numeral 1 designates the frame of the vehicle. Frame 1 comprises spaced transverse bars 2 connected together by longitudinal bars 3 and 3a. Disposed below the bars 3, and transversely, is a conventional form of rear axle mechanism 4 having ground engaging wheels 5 on the ends thereof, and a conventional differential 6.

The axle housing 4 is connected to bars 3 in any suitable manner. Bolts 7 are shown for purposes of illustration. The wheels 5 are rotated by means of an engine 8, which engine may be of any type, and which engine drives a shaft 9 having a sprocket 10 on the outer end thereof, and extending around the sprocket 10 and around a sprocket 11, which drives the differential, is an endless sprocket chain 12. Extending forwardly from the forward transverse bar 2 is a forwardly and upwardly inclined bar 13, which is in a vertical central longitudinal plane of the machine. The forward end of bar 13 terminates in a sleeve 14, having rotatably mounted therein the shaft 15 carried by the forks 16 of the front wheel 17. Secured to the upper end of shaft 15 is a lever 18, to the outer end of which lever is connected a rearwardly extending steering link 19. The rear end of link 19 is connected to a lever 20 carried by the upper end of a vertical shaft 21. Vertical shaft 21 is rotatably mounted in a sleeve 22, welded or otherwise secured at 23 to the bar 13. Secured to the lower end of shaft 21 is a substantially horizontal foot rest 24 having curved outer ends 25, hence it will be seen that the operator can steer the vehicle by rotating the shaft 21 with his feet, and at the same time thin, cultivate or plant in the row a. This operator occupies the seat 26. Other operators occupy seats 27, 28 and 29.

It will be noted that all of the seats are positioned whereby the occupants thereof will face at forwardly inclined angles, and with their feet on the various foot supports, they can work with both hands between their legs for the thinning, hand cultivating or planting operation. All of the seats are disposed adjacent the ground, clearly shown in Figure 2, hence there is no leaning over, and the body and legs are in a natural position, obviating the laborious operations now employed, and where the seats are relatively high in relation to the ground.

Supported on each of the transverse bars 2, by means of vertical brackets 30, are transverse horizontal shafts 31, on which shafts are slidably mounted sleeves 32 having stud bolts 33, which stud bolts extend through vertically elongated slots 34 in the vertical arms 35 of the seat supporting brackets. The seat supporting brackets, at their lower ends, terminate in angularly disposed arms 36, the outer ends of which are provided with slotted seat supporting arms 37, on which arms the seats are adjustably mounted for adjustment towards and away from the rows and for angularly forward adjustment, as shown in Figure 1. In connection with the seat supporting brackets, of seats 27, 28 and 29, foot rests 38 are provided, substantially in the planes of the seats, and these foot rests may be adjustable if desired. Some of the brackets 35 act as foot rests, being provided with foot engaging arms 39 in the planes of the seats, and it will be noted the foot rests and seat brackets can be adjusted laterally in relation to each other and in relation to the plant rows $a$, $b$, $c$ and $d$. It will be noted that the operator occupying the seat 26 steers the vehicle in its forward movement during the manual thinning of the row $a$, and it is obvious that, after the position of the seat 26 in relation to the row $a$ is established, the operator on seat 26 can accurately position all the other seats for the operators working on the other rows.

From the above it will be seen that a thinning or cultivating vehicle is provided on which a plurality of operators ride in a comfortable non-cramped position for manual thinning, cultivating or planting, and for other work of a manual type necessary involving plant rows. It will also be seen that the machine is of the straddle row type, and a plurality of rows may be serviced in each trip of the machine from one end of the field to the other.

The invention having been set forth what is claimed as new and useful is:

1. A plant thinning carriage, said carriage comprising a frame, said frame comprising longitudinally spaced transverse bars, said bars being connected by longitudinal braces, each of said frame bars being provided with a plurality of shafts spaced upwardly therefrom, seat and foot rest members longitudinally adjustable on said shafts, said seat and foot rest members extending downwardly and terminating in lateral arms adjacent the ground, seats carried by some of said arms and means for propelling the carriage forwardly in straddle relation to a plurality of rows of plants.

2. A device as set forth in claim 1 including means whereby said foot and seat supporting members are also adjustably secured to said shafts for vertical movement for positioning the said foot and seat members in relation to the ground.

ALVIN R. MADSEN.

REFERENCES CITED

The following references are of record in the file of this patent:

UNITED STATES PATENTS

| Number | Name | Date |
|---|---|---|
| 2,261,354 | Fee | Nov. 4, 1941 |
| 2,378,143 | Jensen | June 12, 1945 |
| 2,453,348 | Speigel et al. | Nov. 9, 1948 |